United States Patent [19]

Hong

[11] Patent Number: 5,706,063
[45] Date of Patent: Jan. 6, 1998

[54] OPTICAL SYSTEM OF A REFLECTION LCD PROJECTOR

[75] Inventor: Chang-wan Hong, Anyang, Rep. of Korea

[73] Assignee: Samsung Electronics Co., Ltd., Kyungki-do, Rep. of Korea

[21] Appl. No.: 543,008

[22] Filed: Oct. 13, 1995

[30] Foreign Application Priority Data

Nov. 25, 1994 [KR] Rep. of Korea ............ 94-31225

[51] Int. Cl.⁶ .................................. G02F 1/1335
[52] U.S. Cl. .................................. 349/9; 349/117
[58] Field of Search ............... 359/40, 41, 73; 349/5, 9, 117

[56] References Cited

U.S. PATENT DOCUMENTS

| | | |
|---|---|---|
| 5,042,921 | 8/1991 | Sato et al. ............... 349/9 |
| 5,052,783 | 10/1991 | Hamada ............... 359/40 |
| 5,153,752 | 10/1992 | Kurematsu et al. ............... 359/40 |
| 5,239,322 | 8/1993 | Takanashi et al. ............... 359/40 |

Primary Examiner—William L. Sikes
Assistant Examiner—Julie Ngo
Attorney, Agent, or Firm—Sughrue, Mion, Zinn, Macpeak & Seas, PLLC

[57] ABSTRACT

An optical system of an LCD projector includes a light beam splitter for passing only a specific wavelength of light emitted from a light source and reflecting another wavelength. Two reflection type LCDs for a black-and-white signal and a color signal, respectively, are placed in correspondence with the light of the respective wavelengths, split by the light beam splitter. The LCDs either transmit or scatter the light of the respective wavelengths according to whether the particular LCD is turned on or off, so that the resolution can be improved by projecting the LCD for the black-and-white signal together with the LCD for the color signal.

7 Claims, 4 Drawing Sheets

FIG. 4

| R | G | B | R | R | G | B | R | G | R |
|---|---|---|---|---|---|---|---|---|---|
| G | B | R | G | B | R | G | B | R | G | B |
| R | G | B | R | G | B | R | G | B | R |

FIG. 5

| Y | Y | Y | Y | Y | Y | Y | Y | Y | Y |
|---|---|---|---|---|---|---|---|---|---|
| Y | Y | Y | Y | Y | Y | Y | Y | Y | Y |
| Y | Y | Y | Y | Y | Y | Y | Y | Y |

OPTICAL SYSTEM OF A REFLECTION LCD PROJECTOR

BACKGROUND OF THE INVENTION

The present invention relates to a liquid crystal display (LCD) projector and, more particularly, to an optical system of an LCD projector which can provide an image of high quality by using two reflection-type LCDs.

Recently, with the development of the information industry, the demand for image displaying means having a larger screen has increased. In the case of a direct-viewing type cathode ray tube (CRT) constituting a television receiver, i.e., conventional image displaying means, the CRT itself should be large in order to provide a large screen. However, there are many limitations when attempting to achieve large displays in this manner. Furthermore, even if the CRT could be made somewhat larger by overcoming the technical problems, a manufactured product having such a large display tube would be overly bulky and excessively heavy.

As an alternative, an image projection system (e.g., a projection-type television or video projector) is a practical device for obtaining a large screen display by circumventing the above-described problems. Here, an image is generated via the use of a small CRT or LCD and magnified by an optical lens, to be projected onto a large screen.

There is a front-type LCD projector as shown in FIG. 1, as a type of the above-described image system. The LCD projector comprises a lamp 11 as a light source for emitting white light and three transmission-type LCDs 12, 13 and 14 as video image displaying means, in front of which collimating lenses 12', 13' and 14' are provided. The light emitted from lamp 11 is reflected by a reflective mirror 15 and separated into three colors, red (R), green (G) and blue (B), by dichroic mirrors 16 and 16'. Such a separated light of each color is transmitted to the LCDs 12 (via reflective mirror 17), 13 and 14 for displaying the image signal corresponding to each color. The light of each color, which has passed through the LCDs, is synthesized by dichroic mirrors 18 and 20 and a reflective mirror 19, and the synthesized light is incident to a projection lens 21. Then, projection lens 21 projects the image displayed on LCDs 12, 13 and 14 onto a screen S.

The front-type LCD projector, however, has certain drawbacks. Namely, a polarizing filter should be adopted, and thus the screen brightness and contrast are lowered. To improve the contrast, the interior lighting should be as dim as possible, such as that of a movie theater.

SUMMARY OF THE INVENTION

To solve the above problems, it is an object of the present invention to provide an optical system of an LCD projector employing two reflection type LCDs to improve the quality of the projected image.

To achieve the above object, there is provided an optical system of an LCD projector, comprising: a light source for emitting light; a light beam splitter for passing only a specific wavelength of the light emitted from the light source and reflecting another wavelength of the light emitted from the light source; first and second LCD panels, which are placed in correspondence with the light of the respective wavelengths split by the light beam splitter, for reflecting the light of the respective wavelengths; a projecting lens which receives and projects the light reflected by the first and second LCD panels; and a screen, located on the pathway of the light projected by the projecting lens, for receiving the light projected by the projecting lens, wherein the first LCD panel, the light splitter, the projecting lens and the screen form a first optical axis by being located on a common optical axis, and wherein the light source, the light beam splitter, and the second LCD panel form a second optical axis at a predetermined angle with respect to the first optical axis, by being located on a common optical axis.

Particularly, in the optical system of the LCD projector according to the present invention, it is preferable that one of the first and second LCD panels is for a color signal and the other is for a black-and-white signal. Also, it is preferable for the first and second LCD panels to comprise first and second focusing lenses positioned in front thereof, respectively, for focusing the light of the respective wavelengths split by the light beam splitter. In addition, it is preferable to include first and second λ/4 wavelength boards which are located between the first LCD panel and first focusing lens, and between the second LCD panel and second focusing lens, respectively. It is preferable for the light beam splitter to be a polarizing beam splitter slantingly positioned at a predetermined angle with respect to the axis of the light emitted from the light source. It is preferable that the light beam splitter is slantingly positioned at 45° with respect to the axis of the light emitted from the light source. Also, it is preferable that the first and second optical axes form an approximately 90° angle by crossing each other centering around the light beam splitter.

In the optical system of the LCD projector according to the present invention, the angle formed between the first and second optical axes, and the angle formed by the light beam splitter with respect to the light source can be preferably controlled according to the characteristic of each optical system.

BRIEF DESCRIPTION OF THE DRAWINGS

The above objects and advantages of the present invention will become more apparent by describing in detail a preferred embodiment thereof with reference to the attached drawings, in which:

FIG. 4 is a schematic diagram showing an arrangement of a color LCD of two LCDs constituting an optical system of an LCD projector according to the present invention; and FIG. 5 is a schematic diagram showing an arrangement of a black-and-white LCD of two LCDs constituting an optical system of an LCD projector according to the present invention.

DETAILED DESCRIPTION OF THE PREFERRED EMBODIMENT

Figure 1:
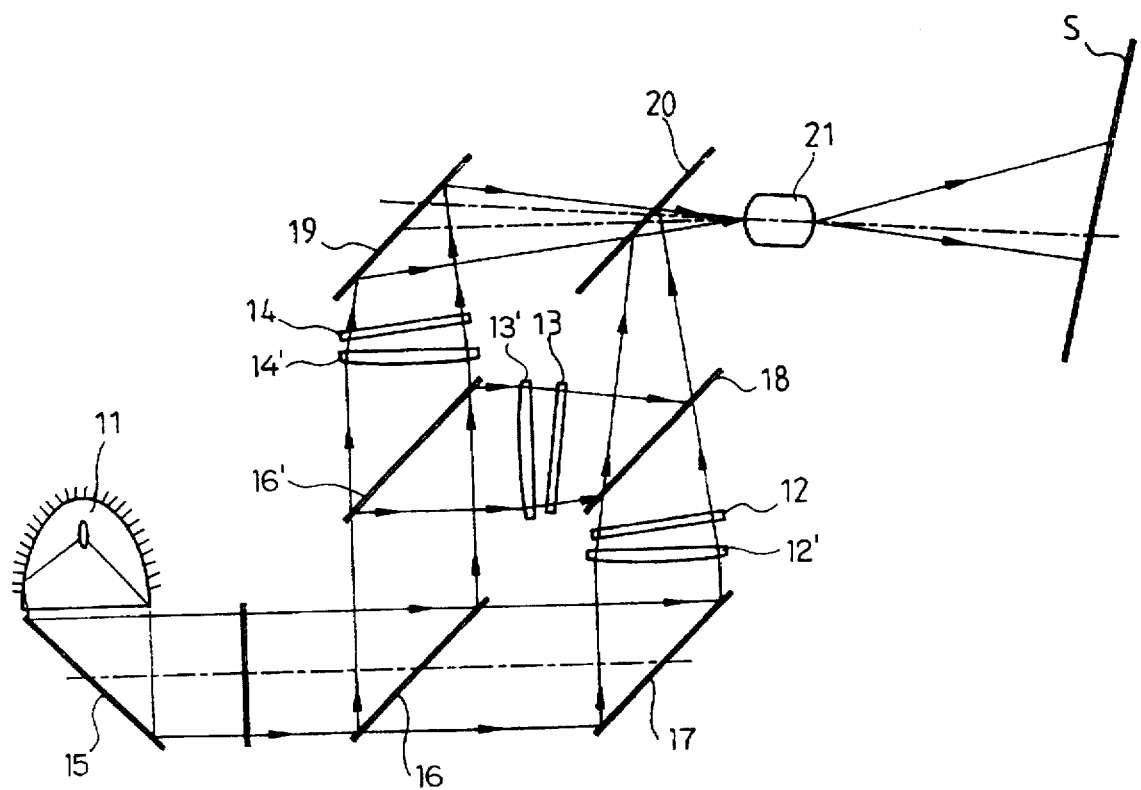
FIG. 1 is a schematic diagram showing an optical system structure of a conventional front-type LCD projector.
Figure 2:
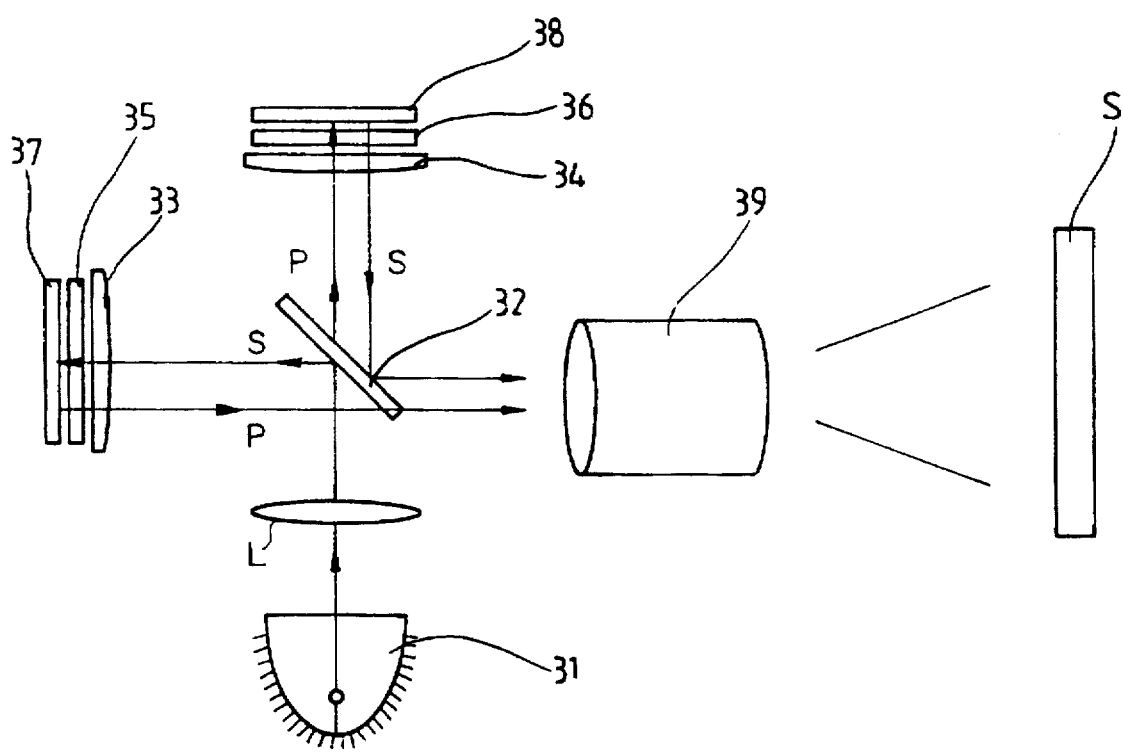
FIG. 2 is a schematic diagram showing an optical system structure of a reflection-type LCD projector according to the present invention.
Figure 3:
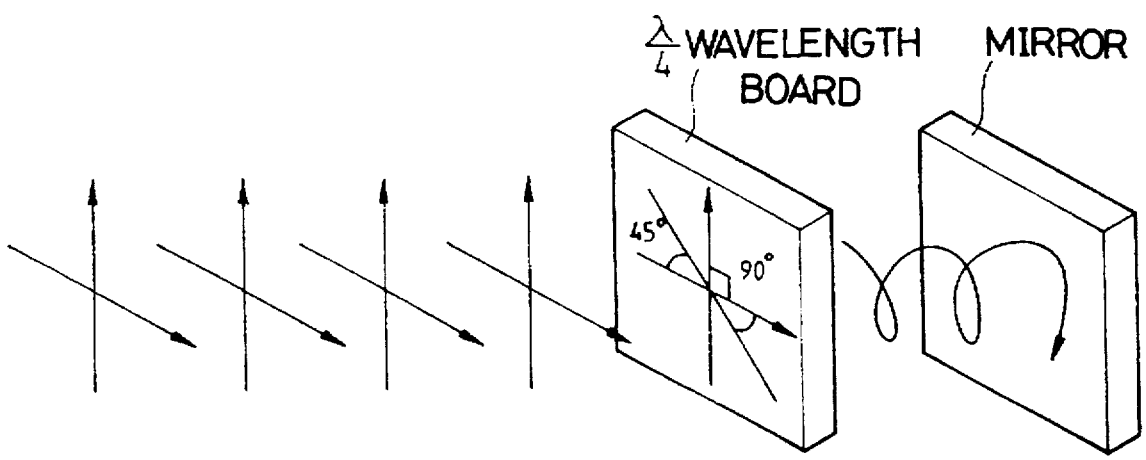
FIG. 3 is a schematic diagram showing a principle of a λ/4 wavelength board to illustrate an optical system of a reflection-type LCD projector according to the present invention.

Referring to FIGS. 2 and 3, an optical system of an LCD projector according to the present invention includes a lamp 31 as a light source and a polarizing beam splitter (PBS) 32 which is aslant disposed at a predetermined angle with respect to the axis of the light emitted from the lamp 31. Here, PBS 32 is for transmitting only a specific wavelength of the light emitted from lamp 31 and reflecting another wavelength thereof. Also, the optical system of the LCD projector includes a first focusing lens 33 and a second focusing lens 34 which are placed in correspondence with each split light beam to focus the respective light beams split by PBS 32. First and second LCD panels 37 and 38 which are located in parallel with the first and second focusing lenses 33 and 34, respectively, to reflect again each light to the PBS 32, focused by the first and second focusing lenses 33 and 34, are included. Also, first and second λ/4 wavelength boards 35 and 36 which are located between the first LCD panel 37 and the first focusing lens 33 which are parallel with each other, and between the second LCD panel 38 and the second focusing lens 34 which are parallel with each other, respectively, are included. The optical system of the LCD projector includes a projecting lens 39 to which the light reflected by the first and second LCD panels 37 and 38 is transmitted, and a screen S which is located on the pathway of the light transmitting projecting lens 39.

In the optical system of the LCD projector according to the present invention, the light is emitted from the lamp 31 as the light source without the polarization and passes through a lens L. However, the light is split into s and p waves of linearly polarized light, while being transmitted by the PBS 32. Thus, the light emitted from the lamp 31 travels, without light loss.

In the state where the light loss is not generated as described above, the s and p waves split by the PBS 32 are reflected by and transmit through the PBS 32 and then pass through λ/4 wavelength boards 35 and 36 via the first and second focusing lenses 33 and 34, respectively, as shown in FIG. 2. Accordingly, the s and p waves are changed into the circularly polarized lights to be incident on the first and second LCD panels 37 and 38 (see FIG. 3). The incident s and p waves are reflected when the first and second LCD panels are turned on, respectively. Then, the reflected s and p waves are polarized by 90° with respect to an incident light axis to be changed into p and s waves (see FIG. 3), respectively, while passing through the λ/4 wavelength boards 35 and 36 via the first and second focusing lenses 33 and 34. The p and s waves pass through and are reflected by the PBS 32, and then the p and s waves are projected to the screen S via the projecting lens 39.

On the other hand, in a state where the LCD is turned off, the light is scattered in the LCD so that the light cannot arrive at projecting lens 39.

The optical system of the LCD projector according to the present invention has two LCDs: one for a black-and-white signal and the other for a color signal. Thus, one color image can be expressed by superposing two images on the screen.

FIG. 4 is a schematic diagram showing an arrangement of a color LCD of two LCDs constituting the optical system of the LCD projector according to the present invention, and FIG. 5 is a schematic diagram showing an arrangement of a black-and-white LCD of two LCDs constituting the optical system of the LCD projector according to the present invention.

Generally, when only one color LCD is used, the pixel is split into R, G and B so that the resolution is lowered. Thus, an expensive high-resolution color LCD must be used to increase the resolution. For example, when a VGA color picture is to be displayed using only one color LCD, a color LCD to be used must have a resolution of 640×3(R, G, B)×480 (about 930 thousand pixels).

However, according to the optical system of the LCD projector of the present invention, a picture having the same brightness as that when adopting the expensive high-resolution color LCD can be obtained by using a low-resolution color LCD with a resolution of 213×3(R,G,B)× 480 (about 310 thousand pixels) and a black-and-white LCD (monochrome panel) with a resolution of 640×480.

Therefore, if a color LCD having an arbitrary resolution is applied to the present invention which additionally adopts a black-and-white LCD, the brightness of the picture is increased by three times. That is, even though a color LCD having the low resolution is applied to the present invention, a picture having the same brightness as that of the color LCD having the high resolution can be obtained at a low price.

As described above, the optical system of the LCD projector according to the present invention comprises the polarizing beam splitter for passing only a specific wavelength of the light emitted from the light source and reflecting another wavelength, and two reflection type LCDs for a black-and-white signal and a color signal, respectively, which are placed in correspondence with the light of the respective wavelengths split by the beam splitter, and for either transmitting or scattering the light of the respective wavelengths according to whether the LCD is turned on or off. Accordingly, the resolution can be improved by projecting the LCD for the black-and-white signal together with the LCD for the color signal.

It is contemplated that numerous modifications may be made to the optical system of the reflection-type LCD projector of the present invention without departing from the spirit and scope of the invention as defined in the following claims.

What is claimed is:

1. An optical system of an LCD projector, comprising:
   a light source for emitting light;
   a light beam splitter for passing only a specific wavelength of the light emitted from said light source and reflecting another wavelength of the light emitted from said light source;
   first and second LCD panels, which are placed in correspondence with the light of the respective wavelengths split by said light beam splitter, for reflecting the light of the respective wavelengths;
   a projecting lens which receives and projects the light reflected by said first and second LCD panels; and
   a screen, located on a pathway of the light projected by said projecting lens, for receiving the light projected by said projecting lens,
   wherein said first LCD panel, said light beam splitter, said projecting lens and said screen form a first optical axis by being located on a common optical axis, and wherein said light source, said light beam splitter, and said second LCD panel form a second optical axis at a predetermined angle with respect to said first optical axis, by being located on a common optical axis, and
   further wherein one of said first and second LCD panels is for a color signal, while the other of said first and second LCD panels is for a black-and-white signal.

2. The optical system of an LCD projector as claimed in claim 1, wherein said first and second LCD panels comprise first and second focusing lenses positioned in front thereof, respectively, for focusing the light of the respective wavelengths split by said light beam splitter.

3. The optical system of an LCD projector as claimed in claim 1, wherein said first and second LCD panels comprise first and second focusing lenses positioned in front thereof, respectively, for focusing the light of the respective wavelengths split by said light beam splitter.

4. The optical system of an LCD projector as claimed in claim 1, further comprising first and second λ/4 wavelength boards which are located between said first LCD panel and first focusing lens, and between said second LCD panel and second focusing lens, respectively.

5. The optical system of an LCD projector as claimed in claim 1, wherein said light beam splitter is a polarizing beam splitter disposed at a predetermined angle with respect to the axis of the light emitted from said light source.

6. The optical system of an LCD projector as claimed in claim 4, wherein said light beam splitter is slantingly positioned at 45° with respect to the second optical axis along which the light emitted from said light source travels.

7. The optical system of an LCD projector as claimed in claim 1, wherein said first and second optical axes form an approximately 90° angle by crossing each other centering around said light beam splitter.

* * * * *